(12) United States Patent
Carver

(10) Patent No.: US 11,385,953 B2
(45) Date of Patent: Jul. 12, 2022

(54) EVENT ACTIVATED ERROR RESOLUTION

(71) Applicant: CERNER INNOVATION, INC., Kansas City, KS (US)

(72) Inventor: Daniel Carver, Raymore, MO (US)

(73) Assignee: CERNER INNOVATION, INC., North Kansas City, MO (US)

(*) Notice: Subject to any disclaimer, the term of this patent is extended or adjusted under 35 U.S.C. 154(b) by 59 days.

(21) Appl. No.: 16/704,020

(22) Filed: Dec. 5, 2019

(65) Prior Publication Data

US 2020/0210269 A1 Jul. 2, 2020

Related U.S. Application Data

(60) Provisional application No. 62/786,712, filed on Dec. 31, 2018.

(51) Int. Cl.
*G06F 11/00* (2006.01)
*G06F 11/07* (2006.01)
*G06F 11/30* (2006.01)

(52) U.S. Cl.
CPC ...... *G06F 11/0772* (2013.01); *G06F 11/0769* (2013.01); *G06F 11/0787* (2013.01); *G06F 11/0793* (2013.01); *G06F 11/3006* (2013.01)

(58) Field of Classification Search
CPC ............. G06F 11/0772; G06F 11/0769; G06F 11/0787; G06F 11/0793; G06F 11/3006; G06F 11/0775; G06F 11/0784
See application file for complete search history.

(56) References Cited

U.S. PATENT DOCUMENTS 9,639,414 B1 * 5/2017 Wu ..................... G06F 11/0748

* cited by examiner

*Primary Examiner* — Katherine Lin
(74) *Attorney, Agent, or Firm* — Shook Hardy & Bacon L.L.P.

(57) ABSTRACT

Computerized systems and methods are provided to intelligently and dynamically monitor at least one account using an evolutionary algorithm to identify and resolve errors. After receiving one or more indications to initiate a controller process as a result of identifying one or more errors within one or more accounts, the controller process is activated. A local cloud controller determines whether the one or more errors are located on a job list that includes a plurality of errors and instruction sets to resolve each of the plurality of errors. Then, the local cloud controller creates one or more agents to implement the instruction sets on the one or more errors to resolve them. Following this, one or more reports are generated that include the status of the one or more errors after the instruction sets have been implemented.

18 Claims, 5 Drawing Sheets

EVENT ACTIVATED ERROR RESOLUTION

CLAIM OF PRIORITY

This application, having entitled "Event Activated Error Resolution," claims priority to U.S. Provisional Patent Application No. 62/786,712, filed Dec. 31, 2018, and entitled, "Event Activated Error Resolution," the entirety of which is incorporated here by reference.

BACKGROUND

From start to finish, the process of managing medical systems, such as hospitals or clinics, is complex. In order for medical systems to be profitable, there are several components working together that must function accurately, efficiently, and smoothly. Thousands of processes are active simultaneously, modifying, creating, and managing data on a daily basis. For example, when an individual visits the emergency department for treatment, several actions must take place in order for the individual to receive proper care and for the hospital to receive payment for the treatment provided. Often times, due to the volume of individuals needing care and human error, there are mistakes made when entering information into an individual's account profile, which results in errors when bills are created, further resulting in a delay or lack of payment for services. As one can imagine, in a medical system where thousands of individuals may receive treatments within in a week, the accumulation of such errors results in significant loss of profit due to lack of payment collection from suspended charges, denials, or incomplete bills.

Currently, errors are resolved via manual human intervention. Each individual account that has an error must be manually corrected in order to resubmit an outstanding invoice for collection of payment. This process is inherently inefficient and error prone due to the near-constant uptime of complex systems like large medical systems, the sheer numeric volume of transactions, the unpredictability of activity, and the potential for human error. It requires full time resources to perform the tedious and repetitive tasks to keep all processes running efficiently and correctly, which requires an individual to make the proper corrections to individual accounts upon the detection of errors. As such, hospital systems are losing millions of dollars in uncollected revenue.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Often times, due to the volume of accounts and number of treatments provided, individuals entering individual information at various stages in the medical process (e.g., registration to treatment to billing) are under pressure to enter information quickly so that the medical system will be able to collect payment for the services provided within a predetermined, and often regulated, time frame. However, unsurprisingly, there are errors made throughout the processes that take place. Making the process more complex is the fact that there are multiple coding systems in use for medical billing. Unfortunately, due to the volume of accounts and complexity of medical coding, there can be thousands of accounts with minor to significant errors, which lead to problems such as refusal by insurance companies to pay for treatment or suspension of charges prior to sending an invoice to the individual or insurance company for payment. It takes a great deal of manpower, time, and attention to currently manually fix each error detected in each account. This time consuming process results in further delays of payment and eventually leads to the loss of millions of dollars a month/year for medical systems.

In light of these issues, an event activated dynamic evolutionary algorithm that can intelligently correct issues within the system in more than one location once detected would lead to correcting errors faster and more effectively, resulting in increased collection of payment for services provided and a decrease in costs previously associated with resolving such errors. By more quickly addressing and fixing errors that prevent or delay revenue collection for clients, a system that uses the event activated dynamic evolutionary algorithm will increase collection rates and make the medical system more profitable overall. Currently, there may be several individuals employed to individually fix errors that arise in the build or due to suspended/not billed charges and resolving such issues takes significant time and money. As such, a system that dynamically identifies errors on its own and creates the resolutions would also result in a reduction in the number of individuals who would need to be dedicated to resolving these technical problems within a system.

Embodiments of the present invention generally relate to computerized systems and methods for monitoring revenue systems using evolutionary algorithms to identify and resolve errors within individual accounts across the system. The system is configured to receive one or more indications to initiate a controller process as a result of identifying one or more errors within one or more accounts. The system then activates the controller process with a time delay, which allows for the controller process to further identify additional accounts comprising the same one or more errors that have been identified. Then, the system determines whether the one or more errors are included on a job list that includes a plurality of errors and corresponding instructional sets to resolve each of the plurality of errors. Following this, the system creates one or more agents to implement the instruction sets on the one or more errors to resolve them and then subsequently generates one or more reports including a status of the one or more errors after the instruction sets have been implemented.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
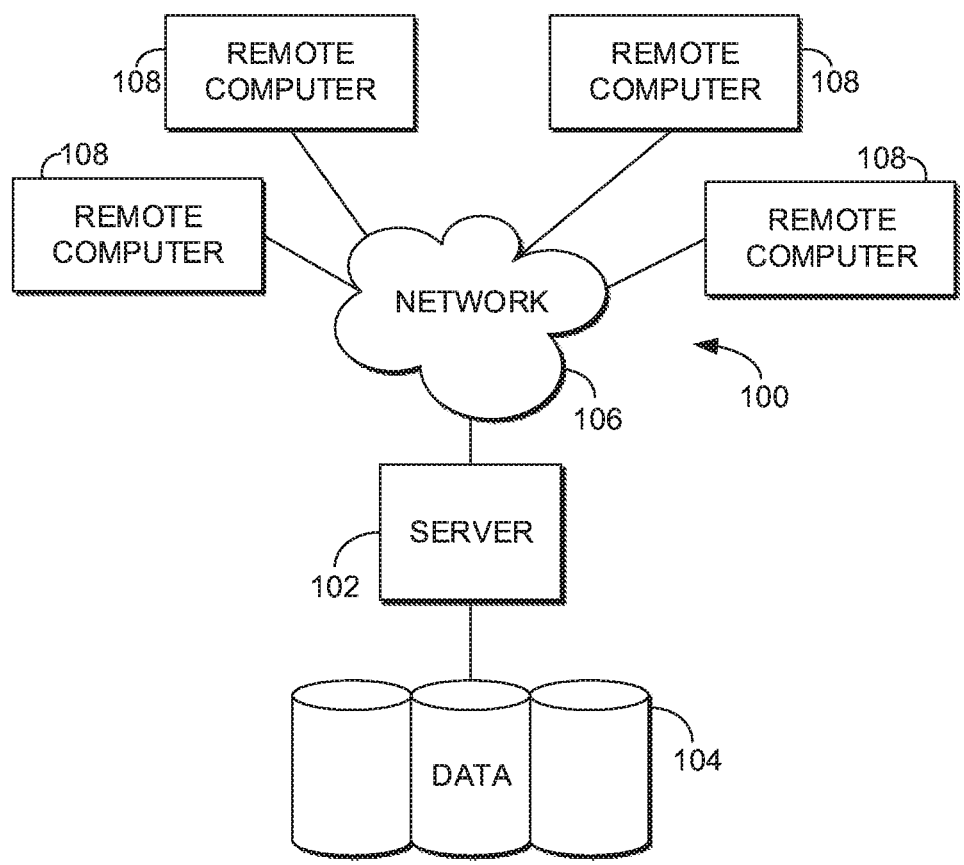
FIG. 1 is a block diagram of an exemplary system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

The billing process within medical systems once an individual has been treated is complex and requires the input of multiple individuals. Generally, the process begins with an individual arriving at a clinic, doctor's office, or emergency department with some problem. When the individual enters, for example the emergency department, they first check in and provide basic personal information such as their name, date of birth, insurance information, and indicate the medical issue for which they are seeking treatment. After this, the individual is brought to triage where a hospital employee (e.g., nurse) takes the individual's vital signs, additional medical history, and additional personal information, which is all entered into the individual's electronic health record/account. However, sometimes, due to human error, the information input at this stage may not be entered correctly or, if the individual already has an existing health record in the hospital, any modifications may not register and save correctly. When these issues occur, it may lead to problems later on when the hospital, via a revenue collecting system, attempts to collect payment for services provided.

After the individual receives treatment and is discharged, there is generally a standard delay prior to beginning the billing process to allow for any additional clinical events or services to occur. During this time, the account will be tagged as discharged but not ready to bill. After the standard delay period is complete, various individuals within the hospital's billing/financial departments will translate the services rendered and apply the appropriate billing codes based on insurance. For each point of service, the medical system has 180 days to make sure all the information entered is correct and to collect payment. As such, time is of the essence to ensure that any denials or errors are resolved. If they are not, then it is unlikely that payment will be recovered for the services rendered.

During the preparation of the invoice, there are opportunities for errors such as improper insurance information or improper coding of services. A medical coder processes the treatment provided by medical providers and translates those services into numeric or alphanumeric code, which is then used by a medical biller to create an invoice, bill, or claim for the insurance company and determine the appropriate charges for the individual. The Medical Common Procedure Coding System (HCPCS) is a set of health care procedure codes based on the American Medical Association's Current Procedural Terminology (CPT). Each HCPCS and CPT code corresponds to a type of service rendered. The medical biller utilizes the HCPCS and CPT coding to enter the appropriate codes based on insurance, Medicare/Medicaid regulations, and any potentially applicable state requirements. Based on the coding entered into the invoice or bill, insurance companies and Medicare/Medicaid will either pay or deny payment for each line item included within the invoice received. When errors occur, it results in the pending charges either being suspended, not being billed to the insurance/individual, rejection by insurance companies, or deployment of incomplete invoices due to errors regarding one or more items related to the services provided.

Within medical systems, there are several places where such errors result in significant loss of payment and other complications. For example, if an invoice is prepared for an individual based on services provided, if the charges coded by a medical coder/biller include incorrect information, then the system may automatically suspend the charges within the system. When this occurs, the charges remain suspended in the individual's account and are never billed out to the insurance company or individual for payment. This results in delayed or lost revenue for medical systems, especially when the errors are not caught and corrected within the 180 day time frame for receiving payment. In some circumstances, if the errors are fixed, the medical system may be able to recover the payment, but the amount collected is dependent on how long after service the invoice is posted. Depending on the length of delay, the medical system may or may not be able recover the full amount for the services.

Often times the errors that result in suspended charges are not significant and require a minimal effort to be resolved. However, currently, each individual error requires a dedicated individual to identify the error, understand the cause of the error, and correct the error. In many situations, the error, while not significant, may be related to the actual build of the system. In these cases, the individual identifying and reviewing the error requires technical knowledge of the system build to correct the build issue, which can take weeks or months to resolve. Therefore, even small errors may result in the suspended charge remaining for weeks to months, which then likely leads to lack of partial or full payment. The monitoring system described herein is configured to utilize an evolutionary algorithm to identify and resolve suspended charges and other errors identified so that the charges may post successfully and in turn, a complete and accurate invoice can be sent for payment.

Additionally, errors are often identified in the account registration process for an individual. Each medical system has an accounting component which processes the medical services provided by a medical provider and then determines the charges to be incorporated into an invoice for each individual. The system includes processes that rebuild an individual's account based on changes in their account profile or registration. The process is large, time consuming, and requires complete autonomy on the account to maintain financial balance. As such, the process wastes time and results in delay or loss of payment when errors occur. When inaccurate billing data persists, no bills are sent to payers, resulting in the loss of payment. The present system, as described herein, receives an indication of a failed registration modification. Then the system, via a controller, detects the reason for failure and attempts to resolve the error.

Further, current systems maintain several servers that require precise tuning due to the volume of transactions that are being processed each day (in some cases—millions per day). The servers often affect the performance of a domain as a whole if the tuning is incorrect. Additionally, the distribution of processing generally doesn't come at the most convenient times which requires experts to manually adjust the processes at odd hours, which impacts several areas from revenue to individual care. However, the issue is often not noticed until it is already affecting the domain. The present system, utilizing the evolutionary algorithm, can identify when the incoming rate of transactions within the system have increased, thereby adjusting the allocation of resources in order to overtake the volume of transactions and clean up any backlog that has built up.

Additionally, defects or invalid builds within the system can result in corrupted data that then results in a host of issues from accounts being out of balance to display issues to data loss. Currently, these problems are discussed reactively by individuals and addressed manually by running updates or on-demand processes one location at a time. This results in loss in confidence in the system or solution being used and revenue loss/delay if taken too long to correct. In embodiments discussed herein, the system can utilize the evolutionary algorithm to correct these defects as well.

As described in further detail below, the Event Activated Evolutionary Algorithm increases revenue for medical systems, is self-healing and self-regulating, and can reduce the number of full-time employee hours spent on unskilled tasks. One or more agents interact locally with one another and with the environment and follow rules provided in instruction sets. In this case, the error identified is checked against a job that includes a plurality of errors and corresponding instruction sets to resolve each error. The one or more agents can adjust to the problem or error identified and learn over time, thereby being prepared for resolving potential future errors based on past errors identified. Additionally, the one or more agents, using data gathered from each error identified and resolved, may resolve existing gaps in the build of a medical system by aggregating the instruction sets previously created to resolve gaps or other outstanding errors and intelligently filling the gaps and resolving additional errors not yet detected. Such data may be communicated across multiple systems and provide the opportunity for multiple medical systems to learn and predict/resolve errors faster, more efficiently, and with less cost. The present system will increase payment collection by more quickly addressing and fixing issues that prevent or delay collection of payment. The system is self-healing as it detects the error or failure that has occurred and, based on the algorithm, can prevent future errors. Additionally, the system self-regulates by detecting paused transactions and fixing them so that the paused or suspended charges may post successfully. Further, the system reduces the amount of time spent on unskilled tasks by decreasing the number of human individuals needed to detect errors, resolve errors, and then replay suspended transactions to determine whether the error has been resolved.

Beginning with FIG. 1, an exemplary computing environment suitable for use in implementing embodiments of the present invention is shown. FIG. 1 is an exemplary computing environment (e.g., health-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein. It will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in the implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though devices and components are represented in FIG. 1 as singular devices and components, it will be appreciated that some embodiments may include a plurality of the devices and components such that FIG. 1 should not be considered as limiting the number of a device or component.

The present technology might be operational with numerous other special-purpose computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be operational and/or implemented across computing system environments such as a distributed or wireless "cloud" system. Cloud-based computing systems include a model of networked enterprise storage where data is stored in virtualized storage pools. The cloud-based networked enterprise storage may be public, private, or hosted by a third party, in embodiments. In some embodiments, computer programs or software (e.g., applications) are stored in the cloud and executed in the cloud. Generally, computing devices may access the cloud over a wireless network and any information stored in the cloud or computer programs run from the cloud. Accordingly, a cloud-based computing system may be distributed across multiple physical locations.

The present technology might be described in the context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of non-transitory computer-readable media. Computer-readable media can be any available media that might be accessed by control server 102 and includes volatile and nonvolatile media as well as removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Computer-readable media does not include signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The control server 102 might operate in a computer network 106 using logical connections to one or more remote computers 108. Remote computers 108 might be located at a variety of locations including operating systems, device drivers, and the like. The remote computers might also be physically located in traditional and nontraditional clinical environments so that the entire medical community might be capable of integration on the network. The remote computers might be personal computers, servers, routers, network PCs, peer devices, other common network nodes, or the like and might comprise some or all of the elements described above in relation to the control server. The devices can be personal digital assistants or other like devices. Further, remote computers may be located in a variety of locations including in a medical or research environment, including clinical laboratories (e.g., molecular diagnostic laboratories), hospitals and other individual settings, veterinary environments, ambulatory settings, medical billing and financial offices, hospital administration settings, home medical environments, and clinicians' offices. Medical providers may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 might also be physically located in nontraditional clinical environments so that the entire medical community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information might also be sent directly from a remote medical device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
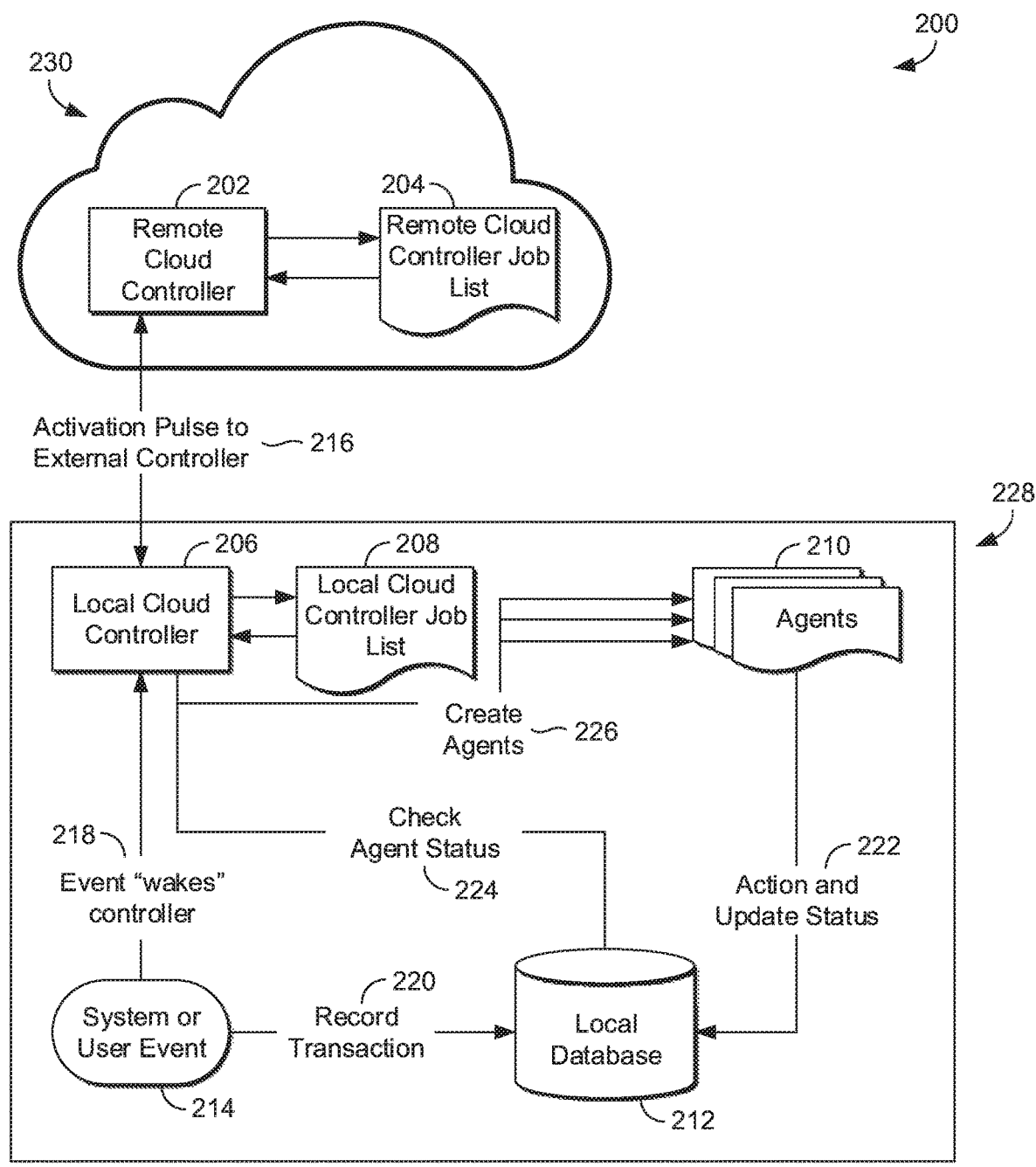
FIG. 2 is an exemplary system architecture suitable to implement embodiments of the present invention.

Turning now to FIG. 2, an exemplary monitory system 200 for dynamically monitoring at least one account using an evolutionary algorithm to identify and resolve errors is depicted. The exemplary monitoring system 200 is merely an example of one suitable system and is not intended to suggest any limitation as to the scope of use or functionality of embodiments of the present invention. Neither should the monitoring system 200 be interpreted as having any dependency or requirement related to any single component or combination of components illustrated herein.

The monitoring system 200 comprises a primary system 228 and a secondary system 230. The primary system 228 further comprises a local cloud controller 206, a local cloud controller job list 208, one or more agents 210, a local database 212, and a system or user event 214. The secondary system 230 comprises a remote cloud controller 202 and a remote cloud controller job list 204. The remote cloud controller 202 and the remote cloud controller job list 204 communicate with one another regarding a plurality of errors identified and approved instruction sets configured to resolve each of the plurality of errors. In some aspects, the remote cloud controller job list 204 is a master list that comprises all of the errors identified within the specific medical system (e.g., within Hospital A or Clinic B). In other circumstances, the remote cloud controller job list 204 may also comprise errors identified in other medical systems (e.g., other hospitals or clinics) and the corresponding instruction sets for resolving each of those errors. Further, FIG. 2 illustrates a primary system 228 and a secondary system 230, but it is contemplated that the monitoring system 200 may comprise additional systems depending on the needs of the monitoring system 200.

While the primary system 228 is illustrated as comprising only one local database 212, it is contemplated that the primary system 228 may comprise additional local databases or a combination of local and remote databases for storing data. The local database 212 may be located remotely or on the cloud. It will be appreciated that some or all of the subcomponents of the primary system 228 and secondary system 230 may be accessed via a network and may reside on one or more devices. Further, in some embodiments, one or more of the illustrated components may be implemented as a stand-alone application. The components described are exemplary in nature and in number and should not be construed as limiting. Any number of components may be employed to achieve the desired functionality within the scope of the embodiments hereof.

Generally, the local cloud controller 206 is configured to receive one or more indications to initiate a controller process as a result of identifying one or more errors within one or more accounts. The one or more indications to initiate the controller process may occur as a result of either a system or user event 214 occurring. For example, an event activates or "wakes" the local cloud controller 206. An event occurs when either an error, failure, or issue of some kind is detected within the medical system. In some circumstances, the monitoring system 200 itself may identify such an event based on monitoring of the medical system or other occurrences such as additional changes to the build of the medical system. In other circumstances, a user, such as an individual who is working on building, repairing, or updating solutions, applications, or other functions within the system, may detect a problem, triggering the user event 214 and "waking" or activating 218 the local cloud controller 206. As such, the monitoring system 200 itself or an individual user may activate the local cloud controller 206. Further, the remote cloud controller 202 may also identify errors and transmit such information to the local cloud controller 206. In these circumstances, the remote cloud controller 202 may transmit data regarding one or more errors identified along with instruction sets that resolve the identified one or more errors to the local cloud controller 206.

When a charge suspends in a financial solution within the medical system, it prevents claims from being billed and as a result, payment for the services provided is not collected. This, in turn, results in delay or loss of money for a medical system. When such events previously occurred, the error detected would be individually corrected by a technical individual who would need to detect the cause of the error, repair the error, and then replay the charge to ensure that the error was resolved and the charge would no longer be suspended. In the present embodiment, the monitoring system 200, utilizing an evolutionary algorithm, activates the local cloud controller 206. The local cloud controller 206 receives an indication to initiate the controller process once one or more errors, failures, or issues within one or more accounts are detected by the monitoring system 200 or by an individual user via a system or user event 214. The controller process is activated by the local cloud controller 206 with a predetermined time delay that allows for the local cloud controller 206 to further identify additional accounts that comprise the same one or more errors. The amount of time allotted for the time delay may be as short as thirty seconds or minutes long and may vary based on the type of error detected or the monitoring system's 200 needs. In the suspended charge example presented above, the controller process may be activated with a five minute delay to consolidate all accounts with suspended charges within the medical system due to the same type of error or errors present. For example, if the suspended charge is caused by a coding error regarding the type of anesthesia administered during surgery, all suspended charges with the same coding error for the same type of anesthesia administered will be identified for correction at the same time, thereby decreasing the resources used to correct the error, reducing the cost to correct the error, and decreasing the time that the suspended charge remains suspended. This process allows for the system to more efficiently resolve errors, by identifying them and then finding all other accounts with similar errors, so that groups of errors may be resolved at once.

Once the time delay has finished, the local cloud controller 206 checks to determine whether the errors identified are on an approved local cloud controller job list 208. The local cloud controller job list 208 includes a plurality of errors and corresponding instruction sets for each of the plurality of errors. In other words, the local cloud controller job list 208 is an inventory or listing of previously identified errors in the system and the approved instruction sets for resolving each of the previously identified errors. As the monitoring system 200 identifies different errors over time, the local cloud controller job list 208 will grow and the utilization of an evolutionary algorithm allows the monitoring system 200 to intelligently predict and prepare for future errors based on previously identified errors within the monitoring system 200.

Additionally, the errors identified on the local cloud controller job list 208 may come from outside the monitoring system 200 itself. For example, the primary system 228 or secondary system 230 may be configured to communicate with other remote systems, such as other systems within the same medical network or even other medical systems (e.g., different hospitals or clinics) that utilize the same financial system. This communication with other remote systems (not shown in FIG. 2) also allows for the remote cloud controller job list 204 to grow over time and include instruction sets to errors that have not yet but may occur in the future. As such, if the primary system 228 receives information about a common error regarding coding for a specific anesthetic, the local cloud controller job list 208 can save this information for future use. It is also contemplated that the monitoring system 200 could check proactively to see if a specific error about which data is received from the remote cloud controller 202 exists within the medical system, but has not yet been detected. If so, then the local cloud controller 206 can proactively activate the controller process once it receives such an indication and then resolve the error, thereby preventing a potentially suspended charge and payment delays.

Following the determination that the one or more errors are on the local cloud controller job list 208, the local cloud controller 206 creates one or more agents 210 to implement the instruction sets on the one or more errors to resolve them. Continuing with the suspended charges example, the local cloud controller 206 will create the one or more agents 210 for each account with a suspended charge caused by the one or more identified errors. The one or more agents 210 are a drone child process that have instruction sets provided by the parent process (the local cloud controller 206). The instruction sets identify the error to be resolved, the action to fix the error, and notification of a result. Additionally, the instruction sets may also comprise identifying the cause of the one or more errors so that the system can learn and prevent future similar errors.

The local cloud controller 206 creates one or more agents 210 for each individual error for each account which allows for success and failure on an individual basis. In other words, since each error within each account has a separate agent 210 that is created to resolve that specific account's error, if the instruction set implemented by the agent 210 does not work and does not resolve the error, it will be on an individual basis. As such, the one or more agents 210 may have success in correcting the same error in some accounts but not others in certain circumstances, but the failure of the implementation of an instruction set on one account containing the same error, will not result in a system wide failure across all accounts with the same error. This is beneficial as only some, if any, accounts will have continued errors, while the majority or all other accounts with the same error might be resolved. It is contemplated that circumstances where the one or more agents 210 may be unsuccessful may include, but are not limited to, accounts with multiple errors or where the error is more complex than initially perceived.

Throughout the process, the local cloud controller 206 may check on the one or more agents 210 and update the status of the errors as shown at 224. The local cloud controller 206 may check on the one or more agents 210 at predetermined intervals. For example, the frequency of checking on the one or more agents 210 may depend on the complexity of the job or may be standard such that the local cloud controller 206 checks on the one or more agents 210 at the same predetermined intervals, regardless of the error being resolved. This information is then transmitted to a local database 212 within the system which will store the status report for future use. The results of the status check may also be transmitted to a user for review (not shown in FIG. 2). Additionally, once all the agents 210 have implemented the instruction sets on the one or more errors within all the accounts detected, the local cloud controller 206 checks the status at 224 of the one or more errors identified and generates one or more reports that include the status of the one or more errors after the instruction sets are implemented. The reports generated are also stored in the local database 212 for future use. In some aspects, the reports generated are also sent to a user for review. Additionally, the monitoring system 200 or local cloud controller 206 may invoke an application to generate the one or more reports. While FIG. 2 shows the local database 212 as storing the reports generated and the status updates at 222, it is contemplated that this data may also be stored on a remote database in certain embodiments. Additionally, the actual system or user event 214 described above is also recorded at 220 into the local database 212 for future use. While not shown in FIG. 2, once the error is resolved, the controller process will terminate. As such, when the error causing the suspended charge is resolved and the controller process terminates, the suspended charges will post successfully now that the error identified has been resolved. Once the suspended charges post successfully, there should be no denials or issues with receiving payment for the charges billed.

In addition to the suspended charges example discussed above, the monitoring system 200 may be utilized to resolve errors found with failed registration modifications. When a registration modification, located in, for example, an account or individual profile, fails to complete, it results in inaccurate billing data (e.g., incorrect capture of treatment, individual profile is updated but change does not save), and it may result in invoices related to treatment care not being sent for payment. Additionally, during the build of the monitoring system 200, errors may occur which are not detectable until a failed regression modification occurs. Often times such errors occur due to simultaneous processing or user action during a process. Examples of failed registration modifications may include an update to an individual's insurance information that does not save or may have occurred at the same time that an individual in the billing department coded the treatment provided into the account and the medical system failed in correctly saving both changes. As such, the charge ends up suspended with an error, such as the billing code entered does not correspond with an approved code for the specific insurance policy. Once such a registration modification is identified, the local cloud controller 206 receives the indication to initiate the controller process. Once again, the controller process is activated with a time delay. In this example, the time delay is provided so that the local cloud controller 206 can further identify additional accounts comprising the same one or more errors. Additionally, the time delay may allow the monitoring system 200 to automatically retry posting the suspended charge to see if the error persists or allow a user to take action on the error prior to the controller process beginning. In circumstances where there may be an existing controller process already active and running, no additional action might be taken as the existing controller process may already include one or more agents 210 that will implement instruction sets to resolve the identified error and as such, duplication of the process is not necessary.

Then, after a predetermined time frame (e.g., one hour), the local cloud controller 206 will recheck the event that activated the controller process and compare it against the local cloud controller job list 208. If the local cloud controller 206 finds that there are still failed registration modifications present, then the local cloud controller 206 creates one or more agents 210 to detect the cause of the failed registration modifications. Based on the cause of the failure, the modification might be retried or a notification may be sent to the local cloud controller 206 indicating that there is a defect or a bad built present. The local cloud controller 206 checks the status of the outstanding registration modification failure and notifies the remote cloud controller 202 if failures persist. If they do, then a report may be sent to the remote cloud controller 202 that alerts for unrecoverable defects and allows individual developers to immediately act or deploy updated instructions. In some aspects, the local cloud controller 206 itself may alert the individual developers of the repeated failures.

As mentioned earlier, the monitoring system 200 may also be utilized for server tuning. Large transactional volume servers within a medical system process millions of instruction sets per day and the incoming rate of the instruction sets directly affects the throughput in circumstances. If a server were to fail or the rate of function drastically changes, it creates a cascading backlog from which recovery is difficult. As such, the monitoring system 200, in some aspects, may also be configured to monitor and manage servers within the medical system in a similar manner as described above. In some embodiments, a transactional observance moment may occur. A transactional observance moment is an observation of the volume of transactional servers processing the millions of instruction sets. Upon the occurrence of the transactional observation moment that detects a growth, the monitoring system 200 will receive an indication to initiate the controller process as a result of the identification of a growth or predetermined change in the server processes. The controller process will be activated without a time delay in this aspect, as time will be of the essence in these situations. The local cloud controller 206 will create one or more server monitoring agents 210 that are configured to calculate a current throughput and determine which resources need to be activated to overtake the current volume and backlog that has occurred. Following this, the one or more agents 210 begin working by recording calculations and resources and terminating their own processes once successful. Then, a second observation moment will occur and the monitoring system 200 will use the prior calculations and compute the throughput trending. If the volume and backlog are resolved, the local cloud controller 206 will send a de-escalation notification. Additional observation moments will occur at predetermined intervals until either the volume is resolved or a maximum resource allocation is reached. When the maximum resource allocation is reached, alarm notifications will occur. This server tuning by the local cloud controller 206 will minimize the need for individuals to manage the server volume and backlog and reserve individual involvement for truly catastrophic events, such as a complete server failure. As a result, the server tuning will also reduce costs.

The components of the monitoring system 200 may further be implemented to quickly address or repair data if a data integrity event occurred. For example, if there was a defect, unforeseen data, or an improperly configured system that causes data corruption, the monitoring system 200, utilizing the evolutionary algorithm, would be able to quickly and efficiently address and repair the corrupted data. Given the large volume of data in a medical system, a small problem that remains undetected could have widespread effects if not detected early. Unfortunately, when solely monitored by human individuals, it requires an individual to take notice of the potential issue before it arises and then the data is manually repaired. In this aspect, the monitoring system 200 receives an indication to initiate the controller process as a result of identifying corrupted data. The specific data corruption issue may be communicated from the remote cloud controller 202 in the secondary system 230 to the local cloud controller 206. Further, the remote cloud controller 202 sends instruction sets for resolving the issue to the local cloud controller 206. The local cloud controller 206 may create one or more agents 210 to implement the received instruction set to resolve the identified corrupted data or may communicate with the remote cloud controller 202 to receive an instruction set from the remote cloud controller job list 204 to resolve the issue. Next, the one or more agents 210 identify and repair the corrupted data to resolve the issue. Once the instruction sets are implemented, one or more reports are generated comprising the status of the corrupted data. These reports may be stored in the local database 212, in a remote database (not shown) and may be further communicated to a user and the remote cloud controller 202.

Figure 3:
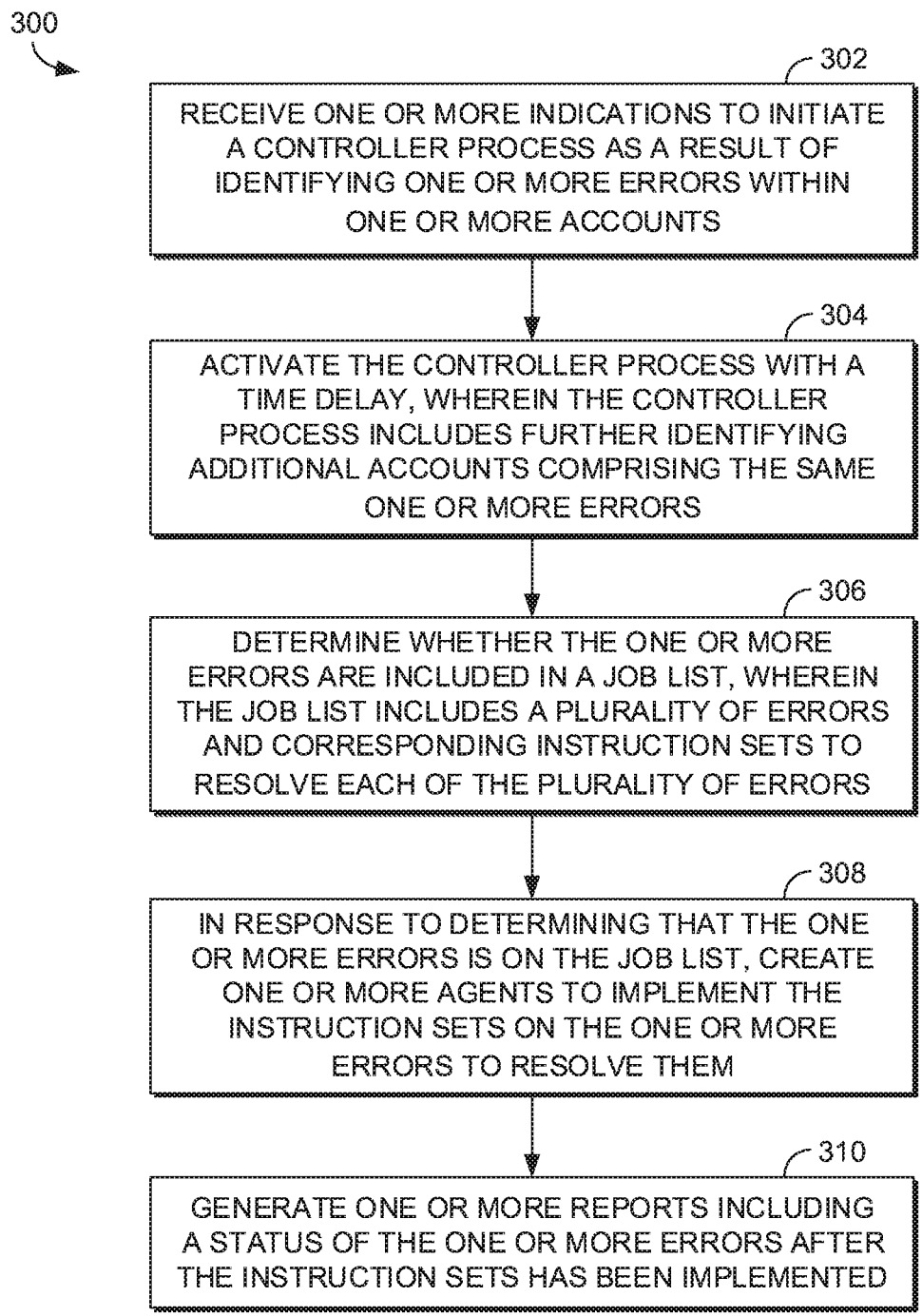
FIG. 3 is a flow diagram showing an exemplary method for dynamically monitoring at least one account to identify and resolve errors.

Next, FIG. 3, illustrates a flow diagram showing an exemplary method 300 for dynamically monitoring at least one account for at least one individual using a voluntary algorithm to identify and resolve errors. The method 300 may be implemented by the monitoring system 200 described with respect to FIG. 2. At step 302, the local cloud controller 206 within the monitoring system 200 receives one or more indications to initiate a controller process as a result of identifying one or more errors within one or more accounts. As mentioned, the local cloud controller 206 may receive the indications of one or more errors from a system or user event 214 or from a remote cloud controller 202 transmitting information regarding errors found elsewhere that may be applicable to monitoring system 200. As such, the local cloud controller 206 is activated when it receives one or more indications of an event, such as a suspended charge, failed registration modification, or a data integrity issue occurs. Next, the controller process is activated by the local cloud controller 206 with a time delay that allows for the controller process to identify additional accounts comprising the same one or more errors at 304. As previously described, the time delay may vary depending on the nature of the error and how widespread the error might be within all accounts. Once all the accounts comprising the same one or more errors have been identified, the local cloud controller 206 determines whether the one or more errors are included in a local cloud controller job list 208 at step 306. The local cloud controller job list 208 includes a plurality of errors and corresponding instruction sets to resolve each of the plurality of errors. Then, in response to determining that the one or more errors are on the job list, the local cloud controller 206 creates one or more agents 210 as shown at 226, to implement the instruction sets on the one or more errors to resolve them at step 308. Once the one or more agents 210 have implemented the instruction sets, one or more reports that include the status of the one or more errors are generated at step 310. While not included in FIG. 3, the local cloud controller 206 may check the status, at any time during the process, of the one or more agents' 210 progress and record such information in a local database 212. Further, the one or more agents 210 themselves may report their status for recording in the local database 212. Additionally, the system or user event 214 may be recorded after it occurs in the local database 212. The local cloud controller 206 may utilize the data stored in the local database 212 for resolving and preventing future errors within the medical system.

Figure 4:
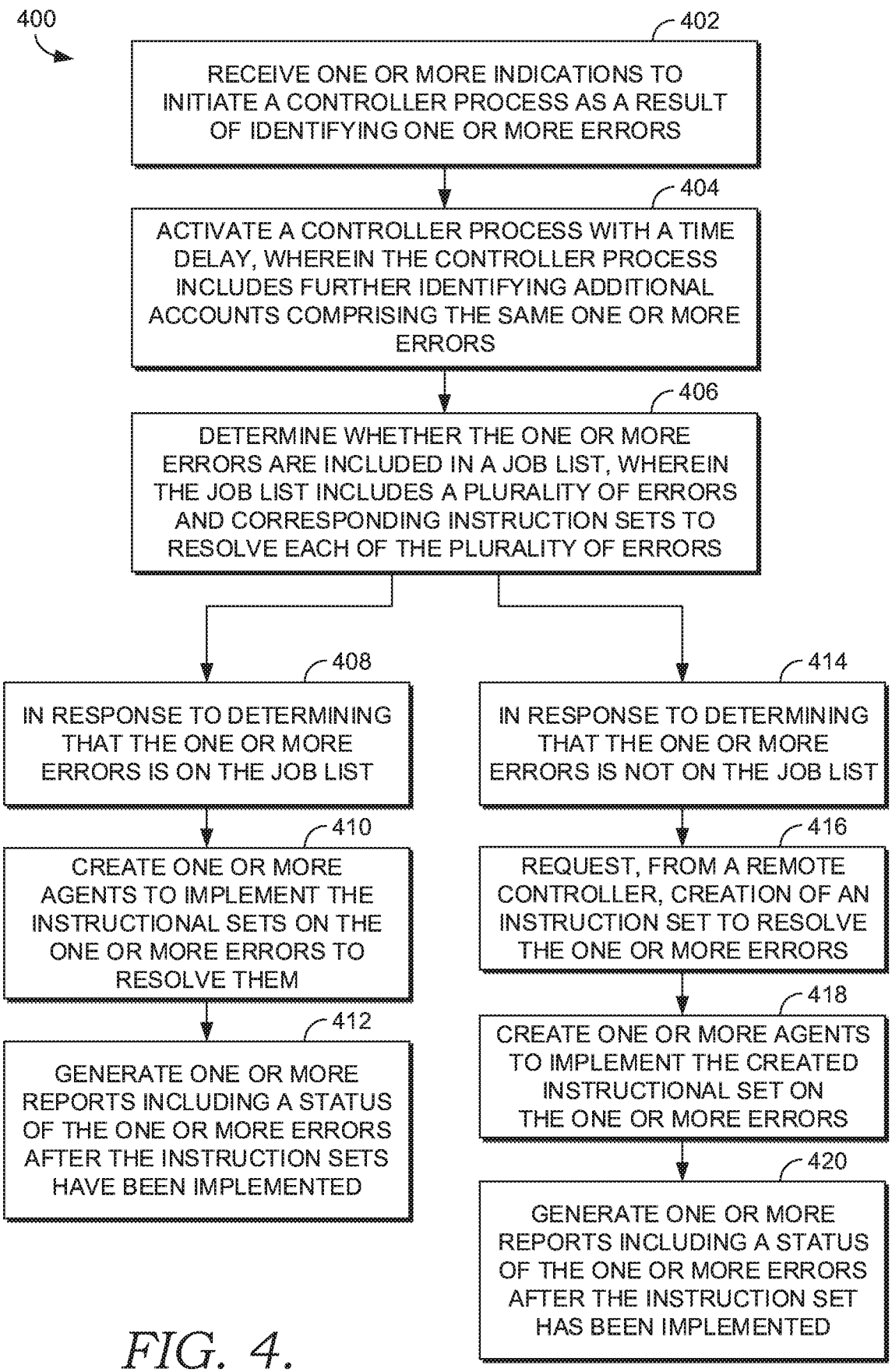
FIG. 4 illustrates an alternate exemplary method for dynamically monitoring at least one account to identify and resolve errors.

Next, FIG. 4 illustrates a flow diagram of another exemplary revenue monitoring system and method for dynamically monitoring at least one individual account using an evolutionary algorithm to identify and resolve errors. Similar to method 300, in method 400, the local cloud controller 206 receives one or more indications to initiate a controller process as a result of identifying one or more errors at step 402. Then, the controller process is activated with a time delay to allow for further identifying of additional accounts with the same one or more errors at step 404. Next, the local cloud controller 206 determines whether the one or more errors are included in the local cloud controller job list 208, wherein the local cloud controller job list 208 includes a plurality of errors and corresponding instructional sets to resolve each error at step 406. If it is determined that the one or more errors are on the local cloud controller job list 208 at step 408, then the local cloud controller 206 creates one or more agents 210 to implement the instruction sets on the one or more errors at step 410. Following this, one or more reports are generated that include the status of the one or more errors at step 412.

On the other hand, if it is determined at step 414 that the one or more errors are not on the local cloud controller job list 208, then the local cloud controller 206 requests a remote cloud controller 202 to create an instructional set to resolve the one or more errors at step 416. After the remote cloud controller 202 creates the instructional set to resolve the one or more errors, the local cloud controller 206 creates one or more agents 210 to implement the instructional set at step 418. After the instructional set is implemented, one or more reports are generated including the status of the one or more errors at step 420.

Figure 5:
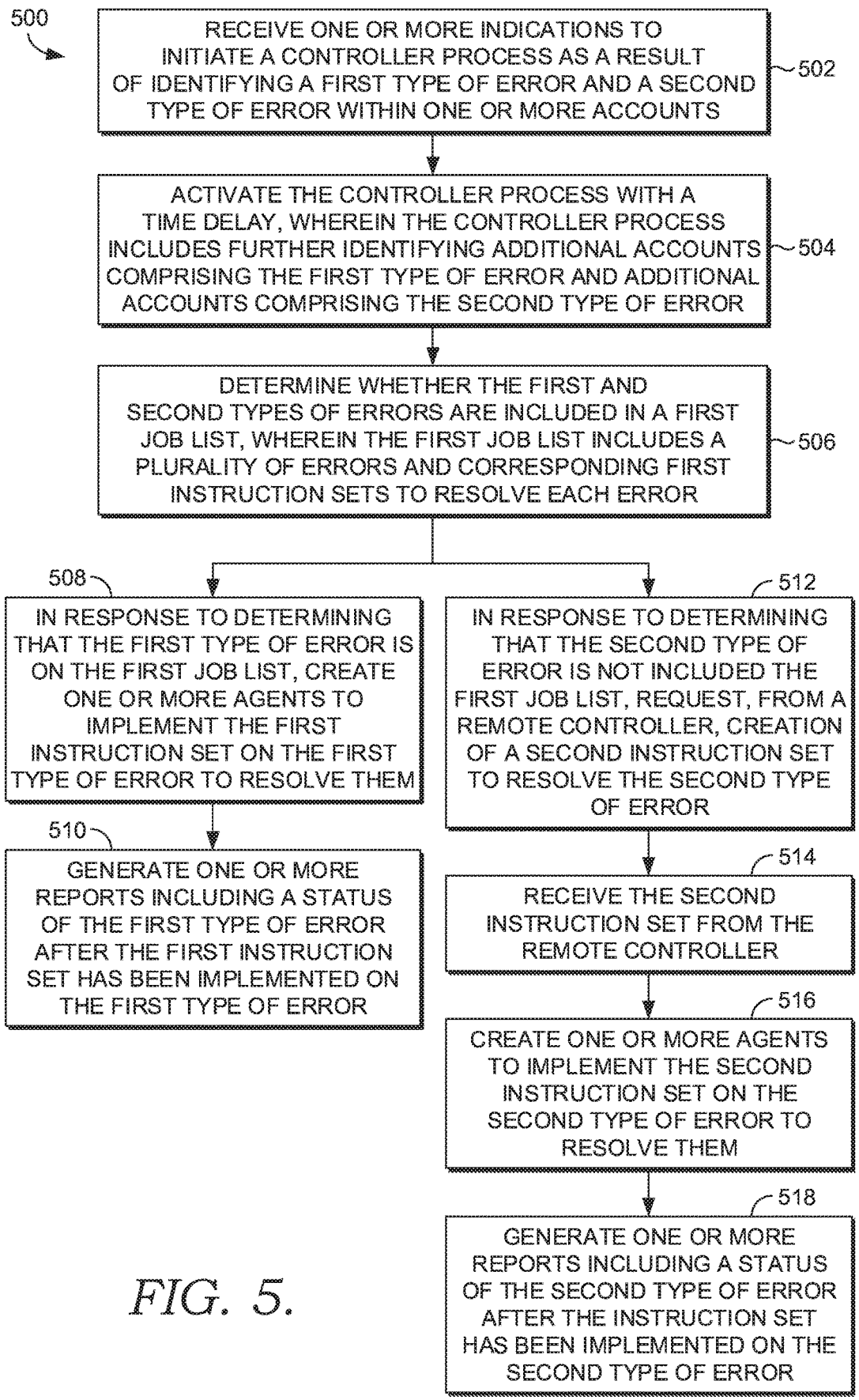
FIG. 5 illustrates yet another exemplary method for dynamically monitoring at least one account to identify and resolve errors.

Continuing, FIG. 5 illustrates another flow diagram for an alternate exemplary revenue monitoring system and method 500 for dynamically monitoring at least one individual account using an evolutionary algorithm to identify and resolve errors. As similarly described in previous embodiments, the method 500 begins with the receipt of one or more indications to initiate a controller process at step 502. However, in this embodiment, a first type of error and a second type of error are identified. The first type of error and the second type of error are different and may be, for example, two different coding errors found within one account or two different errors found in different accounts. After receiving the indication to initiate the controller process, the local cloud controller 206 activates the controller process with a time delay, wherein the controller process includes further identifying additional accounts comprising the first type of error and additional accounts comprising the second type of error at 504. Once the time delay has lapsed, the local cloud controller 206 determines whether the first and second types of errors are included in a first job list, wherein the first job list includes a plurality of errors and corresponding first instruction sets to resolve each error at step 506. In this embodiment, in response to determining that the first type of error is on the first job list, the local cloud controller 206 creates one or more agents 210 to implement the first instruction set on the first type of error to resolve them at step 508. Following this, one or more reports are generated including a status of the first type of error after the first instruction set has been implemented at step 510.

Additionally, in response to determining that the second type of error is not included on the first job list, the local cloud controller 206 requests, from a remote cloud controller 202, creation of a second instruction set to resolve the second type of error at step 512. Upon receiving the second instruction set at step 514, the local cloud controller 206 will then create one or more agents 210 to implement the second instruction set on the second type or error at step 516. Once the second instruction set has been implemented, one or more reports are generated at step 518 that include the status of the second type of error. The reports generated for the first type of error and the second type of error may further comprise data regarding the type of errors identified, a cause of the errors, and the instruction set implemented. Additionally, these reports may be stored in the local database 212 or in a remote database (not shown in FIG. 2) for future use. Further, in some circumstances, the remote cloud controller 202 may determine whether the second type of error is on a second job list and then transmit the second job list to the local cloud controller 206 so that the one or more agents 210 that the local cloud controller 206 creates can utilize the second job list comprising the second instruction set to resolve the second type of errors.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A revenue monitoring system for dynamically monitoring at least one account for at least one account using an evolutionary algorithm to identify and resolve errors, the system comprising:
   a primary system comprising a local cloud controller, a local cloud controller job list, one or more agents, and a local database; and
   a secondary system comprising a remote cloud controller and a remote cloud controller job list, wherein the remote cloud controller transmits data to the remote cloud controller job list,
   wherein the primary system is comprised of one or more processors configured to:
   receive one or more indications to initiate a controller process as a result of identifying one or more errors within one or more accounts;
   activate the controller process with a time delay, wherein the controller process includes further identifying additional accounts comprising the same one or more errors;
   receive data comprising a job list from the remote cloud controller of the secondary system, wherein the job list includes a plurality of errors and corresponding instruction sets to resolve each of the plurality of errors;
   determine whether the one or more errors identified are included in the job list;
   in response to determining that the one or more errors are on the job list,
   creating one or more agents to implement the instruction sets on the one or more errors to resolve them;
   conducting, via the local cloud controller, a status check on whether the one or more agents have resolved the one or more errors, and transmitting the status check results to a local database;
   invoking an application to generate one or more reports including a status of the one or more errors after the instruction sets have been implemented; and
   utilizing an evolutionary algorithm to intelligently predict future errors based on the one or more errors identified by adjusting to the future errors, being prepared for resolving potential future errors based on past errors identified, and learning over time to predict and resolve errors faster, more efficiently, and with less cost.

2. The system of claim 1, wherein the one or more reports generated are sent to a user.

3. The system of claim 1, wherein the one or more indications to initiate the controller process occurs as a result of either a system or user event occurring.

4. The system of claim 1, further comprising a local cloud controller that activates the controller process.

5. The system of claim 4, further comprising a remote cloud controller that is configured to identify the one or more errors within the system.

6. The system of claim 5, wherein the remote cloud controller notifies the local cloud controller of the one or more errors identified.

7. The system of claim 1, wherein the one or more errors are a suspended charge.

8. The system of claim 7, wherein the one or more agents detect the cause of the suspended charge.

9. The system of claim 8, wherein the suspended charge posts successfully after implantation of the instruction sets by the one or more agents to resolve the one or more errors.

10. A method for dynamically monitoring at least one account for at least one individual using an evolutionary algorithm to identify and resolve errors, the method comprising:
   receiving one or more indications to initiate a controller process as a result of identifying one or more errors within one or more accounts;
   activating the controller process with a time delay, wherein the controller process includes further identifying additional accounts comprising the same one or more errors;

receiving data comprising a job list from the remote cloud controller of a secondary system, wherein the job list includes a plurality of errors and corresponding instruction sets to resolve each of the plurality of errors;

determining whether the one or more errors identified are included in the job list;

in response to determining that the one or more errors are on the job list, creating one or more agents to implement the instruction sets on the one or more errors to resolve them;

conducting, via the local cloud controller, a status check on whether the one or more agents have resolved the one or more errors, and transmitting the status check results to a local database;

generating one or more reports including a status of the one or more errors after the instruction sets have been implemented; and utilizing an evolutionary algorithm to intelligently predict future errors based on the one or more errors identified by adjusting to the future errors, being prepared for resolving potential future errors based on past errors identified, and learning over time to predict and resolve errors faster, more efficiently, and with less cost.

11. The method of claim 10, wherein the one or more errors are a suspended charge.

12. The method of claim 11, further comprising reposting the suspended charge once the one or more agents have implemented the instruction sets to resolve the one or more errors.

13. The method of claim 10, wherein the one or more errors are a failed registration modification.

14. The method of claim 10, further comprising receiving one or more additional indications from a remote cloud controller that identify the one or more errors within the one or more accounts.

15. A revenue monitoring system for dynamically monitoring at least one account for at least one individual using an evolutionary algorithm to identify and resolve errors, the system comprising one or more processors configured to:

receive one or more indications to initiate a controller process as a result of identifying a first type of error and a second type of error within one or more accounts;

activate the controller process with a time delay, wherein the controller process includes further identifying additional accounts comprising the first type of error and additional accounts comprising the second type of error;

receive data comprising a job list from the remote cloud controller of a secondary system, wherein the job list includes a plurality of errors and corresponding instruction sets to resolve each of the plurality of errors;

determine whether the first type of error and the second type of error are included in a first job list, wherein the first job list includes a plurality of errors and corresponding first instruction set to resolve each error;

in response to determining that the first type of error is on the first job list, create one or more agents to implement the first instruction set on the first type of error to resolve them, and generate one or more reports including a status of the first type of error after the first instruction set has been implemented, in response to determining that the second type of error is not included the first job list, request, from a remote controller, creation of a second instruction set to resolve the second type of error, receive the second instruction set from the remote controller, create one or more agents to implement the second instruction set on the second type of error to resolve them, generate one or more reports including a status of the second type of error after the second instruction set has been implemented on the second type of error, and utilize an evolutionary algorithm to intelligently predict future errors based on the first type of error and second type of error identified by adjusting to the future errors, being prepared for resolving potential future errors based on past errors identified, and learning over time to predict and resolve errors faster, more efficiently, and with less cost.

16. The system of claim 15, wherein the one or more reports for the first type of error and the one or more reports for the second type of error generated further comprise data regarding the type of errors identified, a cause of the errors, and the first and second instruction sets implemented.

17. The system of claim 16, wherein the one or more reports are stored for future use to prevent and resolve errors.

18. The system of claim 15, wherein the remote cloud controller determines whether the second type of error is on a second job list.

* * * * *